United States Patent [19]

Thoone

[11] Patent Number: 4,571,637
[45] Date of Patent: Feb. 18, 1986

[54] DEVICE FOR OPTICALLY SCANNING A DOCUMENT

[75] Inventor: Martinus L. G. Thoone, Eindhoven, Netherlands

[73] Assignee: U.S. Philips Corporation, New York, N.Y.

[21] Appl. No.: 572,676

[22] Filed: Jan. 19, 1984

[30] Foreign Application Priority Data

Jan. 25, 1983 [NL] Netherlands .................. 8300250

[51] Int. Cl.[4] .................. H04N 1/10; H04N 1/02; H04N 1/04
[52] U.S. Cl. .................. 358/293; 358/285; 358/294
[58] Field of Search .................. 358/293, 294, 285

[56] References Cited

U.S. PATENT DOCUMENTS

| | | | |
|---|---|---|---|
| 3,947,627 | 3/1976 | Tanaka | 358/294 |
| 4,205,349 | 5/1980 | Kawazu et al. | 358/294 |
| 4,318,135 | 3/1982 | Allis et al. | 358/293 |
| 4,352,128 | 9/1982 | Ohori et al. | 358/293 |
| 4,449,151 | 5/1984 | Yokota et al. | 358/294 |
| 4,459,619 | 7/1984 | Yoshida | 358/294 |

Primary Examiner—Howard W. Britton
Assistant Examiner—John K. Peng
Attorney, Agent, or Firm—Thomas A. Briody; William J. Streeter

[57] ABSTRACT

Optical scanning device having N linear opto-electronic transducers (157, 159, 161) which are substantially aligned with spaces (183, 185) between adjacent transducers. With each transducer (157, 159, 161) is associated an individual imaging system (163, 165, 167) for imaging a narrow strip (171, 173, 175) of the document on the transducer. Each transducer (157, 159, 161) is displaceable with the aid of adjustment means with respect to the associated imaging system (163, 165, 167). As a result the transducers can be adjusted so that the narrow strips (171, 173, 175) adjoin each other and are aligned. Together they cover a narrow elongate part (169) of the document. In this manner, a comparatively large document can be scanned with a high resolving power by means of comparatively simple and hence inexpensive transducers and imaging systems.

4 Claims, 5 Drawing Figures

DEVICE FOR OPTICALLY SCANNING A DOCUMENT

The invention relates to a device for optically scanning a document. At least two linear opto-electronic transducers are provided with an optical system for imaging a narrow elongate part of the document on the transducers. A movable part is provided for displacing the imaged part of the document at right angles to its longitudinal direction in order to scan the desired part of the document.

Such a device is known, for example, from the published European Patent Application No. 27,373. The use of two or more opto-electronic transducers is preferred when comparatively large documents are to be scanned with a high resolving power. When, for example, a width of approximately 217 mm is to be scanned with a resolving power of 11.8 lines per mm (300 lines per inch), the transducer has to comprise 2560 photosensitive elements. The commercially available transducers comprise at most 2048 photosensitive elements and even when in the future longer transducers are available, these transducers will be comparatively expensive. The price per photosensitive element is generally higher as the number of photosensitive elements per transducer increases. Consequently, in many cases it is necessary to use two or more transducers. In the known device, the light originating from the document is subdivided for this purpose by means of an optical component into two beams which produce, through an objective, images on two transducers arranged obliquely one above the other. These two images together yield, as the case may be with a certain overlap, a reproduction of the narrow elongate part of the document, whose length is equal to the width of the document. The optical component comprises two reflecting surfaces which must enclose an accurately defined angle with each other and whose orientation is also accurately defined. Thus, strict requirements are imposed on the accuracy of the manufacturing method. The objective is to produce two accurate images of the scanned part of the document, as a result of which strict requirements have to be imposed on this objective. Due to the fact that the transducers are arranged obliquely one above the other, there is little space available above or below the transducers to accommodate auxiliary electronic circuits, for example control circuits and signal pre-amplifiers. The invention has for its object to provide a device in which the optical system can be composed of comparatively simple and inexpensive components and in which there is room for auxiliary circuits in the immediate proximity of the transducers.

SUMMARY OF THE INVENTION

The device according to the invention includes an imaged part of the document N narrow strips which are contiguous in the longitudinal direction, N representing an integer larger than unity. The device comprises N linear optoelectronic transducers which are substantially aligned with a space between adjacent transducers. The optical system comprises N imaging systems, each associated with one of the transducers. Adjustment means are provided for displacing each transducer with respect to the associated imaging system.

Due to the fact that each imaging system need image only a comparatively small strip of the document on the associated transducer, the imaging systems can be comparatively simple and inexpensive. Moreover, it is possible to vary the length of the imaged part (and hence the width of the document) and/or the resolving power by choosing a different number of transducers and associated imaging systems. Due to the fact that the transducers are in line with spaces between, there is room for auxiliary circuits beside and between the transducers.

In order to permit choosing the strips imaged by the imaging systems on the transducers in a simple manner so that they together constitute a continuous region covering the whole width of the document, a preferred embodiment of the device according to the invention has adjustment means designed to perform translations of the transducer with respect to the imaging system along the optical axis of the imaging system and in two directions at right angles to this optical axis. The adjustment means also provides rotation of the transducer about the optical axis and about an axis at right angles to the optical axis and to the longitudinal direction of the transducer.

The invention will now be described more fully with reference to the drawings.

DESCRIPTION OF THE PREFERRED EMBODIMENT

Figure 1:
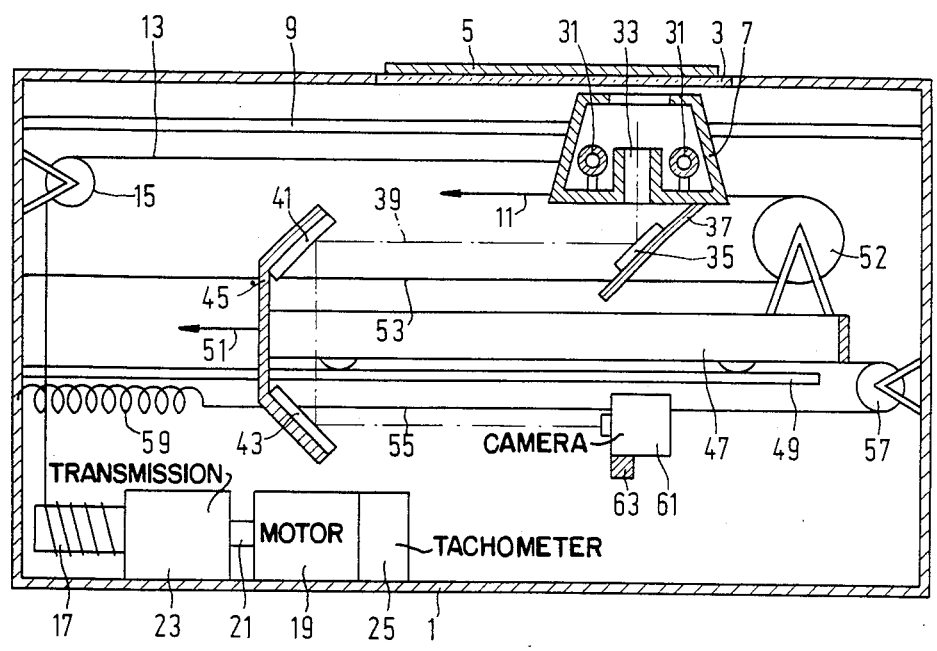
FIG. 1 is a diagrammatic longitudinal sectional view of an embodiment of a device according to the invention.

The device shown in FIG. 1 comprises a housing 1 whose upper surface has a transparent portion 3 which serves as a platen for a document 5 to be scanned. Immediately below this platen is situated a first carriage 7 which can be moved over a first system of rails 9 parallel to the platen in the direction of the arrow 11 over a distance which is at least equal to the length of the document 5. This carriage is pulled by a cable 13 which is passed by a guide roller 15 to a cable drum 17. The cable drum 17 is driven by a motor 19 which is connected to the cable drum by a slip-coupling 21 and a transmission 23. A tachometer 25 is provided for controlling the motor 19.

The first carriage 7 accommodates two linear light sources 31, for example tubular lamps, which illuminate a part of the document 5. Light reflected from this part of the document passes through an opening 33 in the bottom of the first carriage and is reflected at a first planar mirror 35 which is secured on the first carriage by means of a holder 37. The plane of this mirror encloses an angle of 45° with the light beam 39 originating from the document 5, which beam is indicated by a dot-and-dash line and is deflected by this mirror through 90° so that it extends parallel to the direction of movement 11 of the first carriage 7.

The light beam 39 then strikes a second planar mirror 41 and a third planar mirror 43 which each deflect the beam through an angle of 90° so that the beam is deflected through an overall angle of 180° and is then directed in a sense opposite to that of the direction of movement 11 of the first carriage 7. The second planar mirror 41 and the third planar mirror 43 are secured by means of a holder 45 on a second carriage 47, which can be moved along a second system of rails 49 in a direction 51 parallel to the direction of movement 11 of the first carriage 7. The second carriage 47 has secured to it a pulley 52 over which is passed a cable 53, one end of which is secured to the first carriage 7 and the other end of which is secured to the housing 1. As a result the second carriage moves in the same direction as the first carriage, but at a speed which is equal to half that of the first carriage. The second carriage 47 is further connected by a cable 55 passed over a guide roller 57 to one end of a spring 59, the other end of which is connected to the housing 1. When the two carriages are moved to the left by rotation of the motor 19 in one direction this spring is stretched when the motor rotates in the opposite direction, the spring drives the carriages back into their starting positions.

After it has been deflected by the third planar mirror 43, the light beam 39 strikes a number of camera systems 61, each of which produces an image of a narrow strip-shaped part of the document 5 on a linear opto-electronic transducer. The transducer converts the image into electrical signals which can be stored in a memory or can be processed in a different manner. The camera systems 61, of which only one is shown in FIG. 1, are fixedly arranged on a mounting beam 63 secured to the housing 1. During the movement of the first carriage 7, the imaged strip-shaped parts are displaced at right angles to their longitudinal direction over the whole length of the document 5 so that the whole document is scanned. If desired, the first carriage 7 may of course be displaced over a shorter distance in order to scan only a predetermined part of the document. Due to the fact that the second and the third planar mirrors 41 and 43, respectively, move at half the speed in the same direction as the first planar mirror 35, the overall pathlength of the light beam 39 remains constant for all positions of the two carriages 7 and 47. High definition images are always produced at the area of the transducers.

Figure 2:
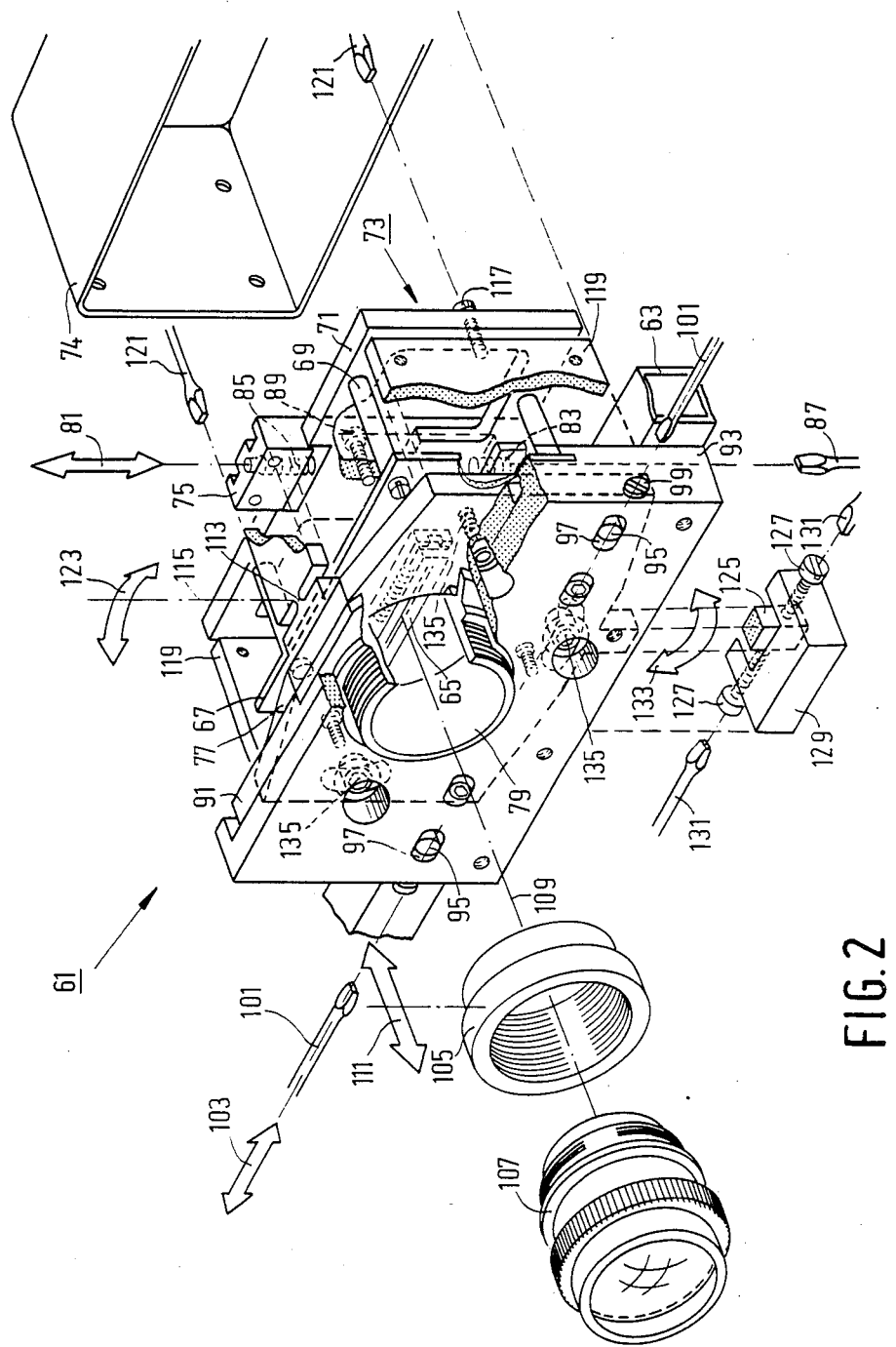
FIG. 2 is an exploded view of a camera system for the device shown in FIG. 1.

FIG. 2 shows in greater detail one of the camera systems 61 with the associated incorporated photoelectric transducers.

The photoelectric transducer 65 comprises a large number (for example 512, 1024, 1728 or 2048) of photosensitive elements which are arranged beside each other on a straight line. The transducer 65 is mounted on a printed circuit board 67, on which are also provided auxiliary circuits (not shown) for the control of the transducer and the amplification of the output signals. The board 67 is secured by means of bolts with spacer sleeves 69 on a back plate 71 of a camera 73. The camera 73 constitutes, together with the transducer 65, the camera system 61 which, if desired, may be accommodated in a protective housing 74. The back plate 71 is connected by a connection member 75 to a front plate 77 in which a threaded sleeve 79 is arranged. To this end the back plate 71 is provided on the rear side with a vertical U-shaped slot (not shown in the Figure) in which the yoke of the connection member 75 is situated. The connection between the U-shaped connection member 75 and the front plate 77 is a fixed connection. The back plate 71 is adjustable in a vertical direction with respect to the connection member, as is indicated by the arrow 81. For this purpose, an adjustment screw 83 is arranged in the lower side of the connection member 75, which screw urges against the lower edge of the back plate 71. In the upper side of the connection member 75 there is provided a compression spring 85 which urges against the upper edge of the backplate 71. When the adjustment screw 83 is turned upwards by means of a screw-driver 87, the back plate 71 moves upwards, whereas when the adjustment screw is turned downwards, the spring 85 presses the backplate downwards. By means of locking screws 89, the back plate 71 can be pressed against the connection member 75, after which a further unintentional vertical displacement of the back plate is no longer possible.

The front plate 77 is connected by an intermediate plate 91 to a mounting plate 93 which is fixedly mounted on the mounting beam 63. The intermediate plate 91 is provided on the front side with projections 95 which project into elongate openings 97 in the mounting plate 93. These openings have their largest dimension in the horizontal direction. In the mounting plate 93 there are provided screws 99 which urge from the outer side against the projections 95. When these screws are rotated by means of screw-drivers 101, the intermediate plate 91 and hence the whole camera 73 can be displaced in counterclockwise or clockwise direction, as indicated by the arrow 103. The projections 95 projecting into the elongate openings 97 prevent a vertical displacement and a rotation of the intermediate plate 91 with respect to the mounting plate 93.

Onto the threaded sleeve 79 is screwed an adjustment ring 105, into which is screwed an imaging system 107 constituted by a lens system. The imaging system 107 can be displaced along its optical axis 109 by rotation of the adjustment ring 105, as indicated by the arrow 111.

In the two limbs of the U-shaped connection member 75 there are located above and below the centre of transducer 65 constrictions 113, which permit rotating the back plate 71 with respect to the front plate 77 about a vertical axis 115 through the two constrictions. For this purpose, there are provided in the back plate 71 two adjustment screws 117 which urge against two side plates 119 fixedly secured to the front plate 77. When these adjustment screws are rotated in opposite senses by means of screwdrivers 121, the back plate 71 rotates in the direction indicated by the arrow 123.

The front plate 77 is provided on the lower side with a projection 125. Two adjustment screws 127 are situated in the limbs of a U-shaped holder 129 fixedly secured to the intermediate plate 91, which limbs extend on either side of this projection. These adjustment screws urge each one against the projection 125 from the lefthand side and from the righthand side. When the adjustment screws 127 are rotated in opposite senses by means of screw-drivers 131, the camera 73 rotates with respct to the intermediate plate 91 about an axis coinciding with the optical axis 109, as is indicated by the arrow 133. By means of locking screws 135, the intermediate plate 91 can be fixedly secured to the front plate 77, after which a further rotation in the direction of the arrow 133 is no longer possible.

It will be seen from the foregoing that the adjustment means described render it possible for the transducer 65 to perform translations in three orthogonal directions and rotations about two orthogonal axes with respect to the imaging system 107. The three translation directions are directed along the optical axis 109 (arrow 111), at right angles to this axis in the vertical direction (arrow 81) and in the horizontal direction (arrow 103). The two rotations are performed about the optical axis 109 (arrow 133) and about the axis 115 which is at right angles to the optical axis and to the longitudinal direction of the transducer 65 (arrow 123). Due to these adjustment possibilities, a predetermined strip of the document 5 to be scanned can be imaged with high definition on the transducer 65. The definition of the image is adjusted to this end by the transition 111 and the rotation 123 so that it can be ensured that the distance between the transducer 65 and the document 5 is constant throughout the length of the transducer. The location of the imaged strip on the document is chosen by performing the translations 81 and 103 and the rotation 133.

Figure 3:
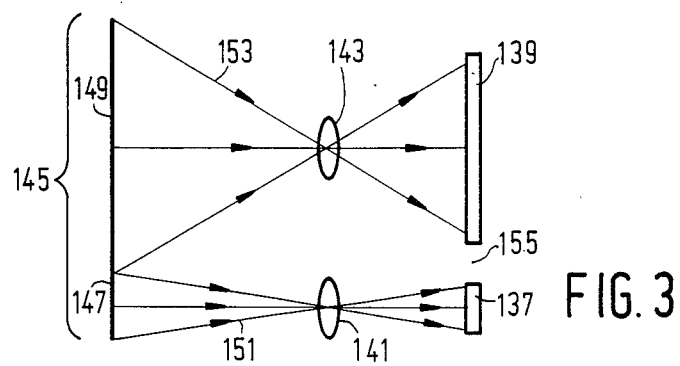
FIG. 3 is a developed view of the optical path in an embodiment of the device according to the invention.
Figure 4:
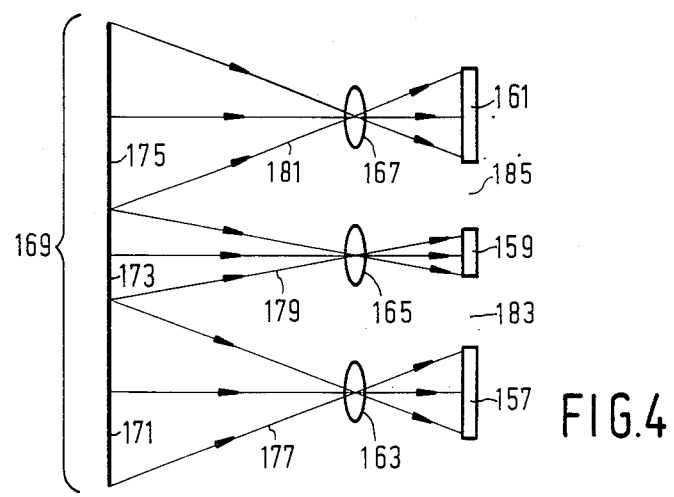
FIG. 4 is a developed view of the optical path in another embodiment.

As can be seen in FIG. 1, the optical path 39 is bent a few times by the mirrors 35, 41 and 43. FIGS. 3 and 4 show diagrammatically developed views of this optical path in the plane of the drawing.

In the embodiment shown in FIG. 3, there are present two linear opto-electronic transducers 137 and 139, with each of which is associated an individual imaging system 141 and 143, respectively, for example in the manner shown in FIG. 2. In this example N is equal to two. The transducers 137 and 139 comprise 512 and 2048 photosensitive elements, respectively. Together they scan a narrow elongate part 145 of the document, the transducer 137 scanning a strip 147 and the transducer 139 scanning a strip 149. The strips 147 and 149 adjoin each other and are aligned with respect to each other. They constitute together the elongate part 145 of the document. The optical path from the strip 147 to the transducer 137 is indicated diagrammatically by 151, whilst the optical path from the strip 149 to the transducer 139 is diagrammatically indicated by 153. Due to the translation possibility 81 indicated in FIG. 2, the two strips 147 and 149 can be relatively displaced in a direction at right angles to the plane of the drawing of FIG. 3 in order that they become accurately aligned with respect to each other. The rotation possibility 133 permits the two strips 147 and 149 to be in the same direction so that the scanned part 145 does not exhibit a bend. The translation possibility 103 can be used to cause the two strips to adjoin each other accurately so that they do not overlap each other and so that no intersection is present between the strips. As can be seen in FIG. 3, the transducers 137 and 139 are substantially aligned with respect to each other after these adjustments have been carried out. A space 155 is present between the two transducers.

The two transducers 137 and 139 together comprise 2560 photosensitive elements. When the length of the scanned part 145 is equal to 217 mm, the resolving power of the scanning is consequently about 11.8 lines per mm (300 lines per inch), which satisfies the most stringent requirements imposed nowadays on commercial digital facsimile systems. The same result could of course be obtained if only one transducer comprising 2560 photosensitive elements would be used. However, such transducers are not yet commercially available. Moreover, in this case, much more stringent requirements have to be imposed on the imaging system which in fact has to image a considerably larger object with high definition without the dimensions of the device being increased to any extent. Thus, thisimaging system becomes much more expensive than the two imaging systems 141 and 143 together. The same would apply to a transducer comprising 2560 image points if such a transducer should be available. Its price would be considerably higher than the price of the two transducers 137 and 139 together.

A further embodiment is shown diagrammatically in FIG. 4. In this case, three transducers 157, 159 and 161 with associated imaging systems 163, 165 and 167 (N=3) are used. The transducers 157 and 161 each comprise 2048 photosensitive elements and the transducer 159 comprises 1024 photosensitive elements. Together they scan a narrow elongate part 169 of a document which is constituted by three narrow strips 171, 173 and 175 which are contiguous in longitudinal direction and each of which is scanned by one of the transducers. The three optical paths are indicated diagrammatically at 177, 179 and 181. The adjustment of the three transducers with respect to the imaging systems is effected in the same manner as in the embodiment shown in FIG. 3. After the adjustment, the three transducers are substantially aligned with spaces 183 and 185 between adjacent transducers. The three transducers 157, 159 and 161 together comprise 5120 photosensitive elements. When the part 169 has a length of 434 mm, the resolving power again is 11.8 lines per mm. A document of the A2 size has dimensions of $420 \times 594$ mm$^2$ so that the length of the part 169 is amply sufficient to comprise the width of such a document. Small deviations in size and an inaccurate positioning of the document are consequently admissible. Thus, this embodiment is suitable for scanning larger documents with unchanged resolving power than is the embodiment shown in FIG. 3.

Figure 5:
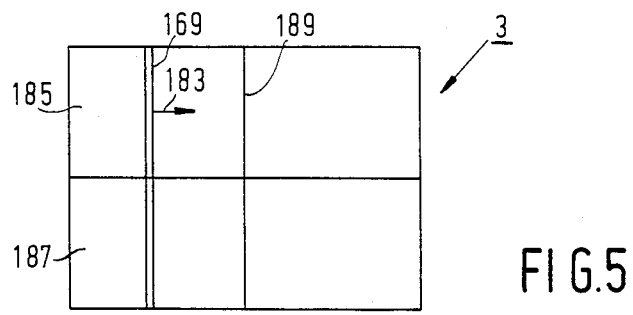
FIG. 5 shows an example of the division of the document platen of a device according to the invention.

When the platen 3 (see FIG. 1) is suitably divided and the scanning method is adapted, smaller documents can be scanned with the same resolving power by means of the embodiment shown in FIG. 4. FIG. 5 shows a possible division of the platen 3 for this purpose. The platen has dimensions of $434 \times 594$ mm$^2$, into which the A2 size easily fits. The scanned part 169 moves in the manner shown with reference to FIG. 1 over the length of the platen in the direction of the arrow 183. When a document of the A2 size has to be scanned, this document covers the whole platen 3. The strip 169 is then displaced throughout the length of the platen. A document of the A3 size has a surface area which is equal to half that of the A2 size and therefore can be disposed so that it covers the half of the platen 3 constituted by the two rectangles 185 and 187. When the scanned part 169 is now displaced only over half the length of the platen 3 (as far as the line 189), the document of the A3 size is scanned in its width direction.

A document of the A4 size fits onto the rectangle 185. This document can be scanned in its longitudinal direction by displacing the scanned part 169 again only as far as the line 189 and by reading only half the number of 5120 photosensitive elements. In this case, therefore, only the transducer 161 and the adjoining half of the transducer 159 are actually utilized. It will be appreciated that each platen size is suitable to scan in an analogous manner various smaller sizes of documents.

What is claimed is:

1. An apparatus for optically scanning a document comprising:
    an optical system having at least two imaging systems for imaging at least two contiguous narrow strips of said document;
    means for displacing said imaged narrow strips at right angles to the longitudinal axis of said document whereby said document is scanned along its length;
    at least two linear opto electronic transducers for detecting each of said imaged narrow contiguous strips, said transducers aligned with each other and spaced apart at ends thereof; and adjustment means for displacing each of said transducers with respect to a respective imaging system, whereby said imaged narrow strips of said document are positioned over a respective opto-electronic transducer.

2. The apparatus of claim 1 wherein said adjustment means includes:

means to provide translation of each transducer with respect to one imaging system along the optical axis of said imaging system;

means to provide translation of each transducer in two directions at right angles to said optical axis; and means to provide translation of each transducer about said optical axis and about an axis at right angles to the optical axis and to the longitudinal direction of the transducer.

3. The apparatus for optically scanning a document of claim 1 wherein said adjustment means comprises:

a back plate supporting said transducers;

a front plate having a central opening for receiving said narrow strip images of said document;

a U-shaped connection member having two arms rigidly connected with said front plate at one end and to said back plate at a second end, said connection member including on one arm at said second end connecting said back plate an adjustment screw for vertically positioning said back plate between said connection member arms against a biasing spring on the remaining arm opposite said screw;

an intermediate plate connecting said front plate to a mounting plate, said intermediate plate having first and second spaced apart projections extending into elongated openings of said mounting plate, said mounting plate further including adjusting screws which bear against opposite sides of each projection to fix said mounting plate rigid with said projections, and when loosened permit relative motion between said mounting plate and intermediate plate along an axis of said elongated openings whereby said front plate and connected back plate supporting said transducers can be positioned along said elongated opening axis.

4. The apparatus for optically scanning a document according to claim 3 further comprising:

a projection member extending from said front plate;

a U-shaped holder connected to said intermediate plate having a pair of arms between which said projection member is received; and first and second additional adjusting screws which are threaded into said holder arms for positioning said projection member between said arms, whereby the relative position of said first and second additional adjusting screws will rotatively position said front plate, back plate and transducers about an optical axis.

* * * * *